United States Patent Office 3,041,340
Patented June 26, 1962

3,041,340
METHOD OF PREPARING SUBSTITUTED PURINES
Milon W. Bullock, Pearl River, N.Y., John J. Hand, New Milford, N.J., and Ross H. Hall, Nanuet, N.Y., assignors to American Cyanamid Company, New York, N.Y., a corporation of Maine
No Drawing. Filed Jan. 18, 1956, Ser. No. 559,774
14 Claims. (Cl. 260—252)

This invention relates to a new method of preparing 6-amino substituted purines and to certain members of this group which are new compounds.

A recent publication, Journal of the American Chemical Society, volume 77, page 1392, March 1955, describes 6-furfurylamino-purine, which is said to be a vegetable tissue growth stimulator. The science of growing tissue, both animal and vegetable, in an artificial medium has become of increasing interest to scientists in the biological sciences. Tissue culture in artificial media permits the growth of vegetable tissue under sterile conditions. It also allows the direct study of growing tissue not possible under the usual conditions of growth. Chemical agents which increase tissue growth are a valuable aid to the study of such growth.

We have found that 6-amino-substituted purines can be prepared with good yields by the following process:

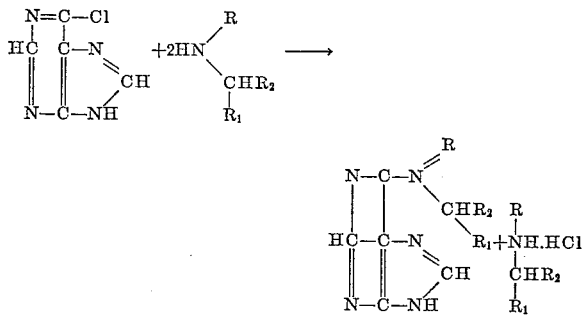

in which R and $R_1$ are hydrogen or lower alkyl radicals and $R_2$ is phenyl, alkyl phenyl, mononuclear heterocyclic radicals and substituted derivatives thereof. The heterocyclic ring can be those such as furane, thiophene, thiazole, thiadiazole, pyridine, pyrrole and the like. This application is a continuation-in-part of our application Serial No. 529,572, filed August 19, 1955, now abandoned.

The reaction may be carried out by heating the 6-chloro-purine with a primary or secondary amine such as shown above in the equation. Solvents such as methyl Cellosolve can be used if desired, and the reaction is generally heated to within a temperature range of 60–150° C. for from ten minutes to several hours. The excess amine can be removed along with any solvent present, usually by distillation under reduced pressure. The crystalline residue can be recovered by filtration and purified in the usual manner by recrystallization or otherwise. The compounds containing a basic group in addition to the 6-amino group of the purine ring such as 6-(2-pyridylmethylamino)-purine, 6-(3-pyridylmethylamino)-purine and 6-(4-pyridylmethylamino)-purine can be reacted with acids to form salts which are readily soluble in aqueous solutions.

The compounds of the present invention are added to a growth media, such as that of Example 4. The carrot tissue designated as Clone II, being genetically homogeneous, is added and the tissue allowed to grow for 28 days. At the end of 28 days, the fresh and dry weights are determined and compared with those of controls grown on the same medium without the presence of the compound being tested. When the compound 6-furfurylaminopurine (kinetin) is grown in such a manner, the following results are obtained at the concentrations indicated:

TABLE I

| | Concentration, µg./ml. | | | | | | | |
|---|---|---|---|---|---|---|---|---|
| | 10 | 5 | 1 | 0.5 | 0.1 | 0.01 | 0.001 | 0 |
| Fresh Wt. (mg.) | 24 | 40 | 230 | 423 | 859 | 357 | 99 | 111 |
| Dry Wt. (mg.) | 1 | 2 | 13 | 23 | 42 | 18 | 6 | 6 |

The above Table I shows that 6-furfurylaminopurine, at 0.1 micrograms/milliliter, stimulates the growth of Clone II carrot tissue to an extent comparable with coconut milk solids. This compound has significant growth-promoting activity at 0.01 g./ml.

The new compounds of the present invention are those in which R and $R_1$ are hydrogen or lower alkyl radicals and $R_2$ is thenyl, phenyl, loweralkylphenyl or pyridyl. These compounds show growth promoting activity as shown in Table II hereinafter. Other compounds such as 6-thenylaminopurine, 6-(3-pyridylmethylamino)-purine and 6-benzylaminopurine, when tested under similar conditions, show a growth-promoting activity greater than 6-furfurylaminopurine. The following Table II summarizes these results.

TABLE II

| Compound | Conc., µg./ml. | | |
|---|---|---|---|
| | 10 | 1 | 0.1 |
| 6-(N-methylfurfurylamino)-purine: | Mg. | Mg. | Mg. |
| Fresh Wt | 157 | 72 | 82 |
| Dry Wt | 9 | 5 | 5 |
| 6-thenylaminopurine: | | | |
| Fresh Wt | 22 | 183 | 1,021 |
| Dry Wt | 1 | 11 | 57 |
| 6-benzylaminopurine: | | | |
| Fresh Wt | 24 | 151 | 1,010 |
| Dry Wt | 1 | 9 | 53 |
| 6-(3-pyridylmethylamino)-purine: | | | |
| Fresh Wt | 445 | 1,233 | 404 |
| Dry Wt | 19 | 54 | 19 |
| Control: | | | |
| Fresh Wt | | 70 | |
| Dry Wt | | 5 | |

The following examples describe the preparation of representative 6-amino substituted purines.

*Example 1*

6-(2-THENYLAMINO)-PURINE

A mixture of 2 g. (12.95 millimoles) of 6-chloropurine, 3.13 g. (27.6 millimoles) 2-thenylamine and 10 ml. methyl Cellosolve was refluxed with an oil bath 90 minutes. The cooled solution crystallized when shaken. The solvent and excess amine were distilled off under the reduced pressure of an oil vacuum pump. The residue was triturated with water and filtered. The filter cake was washed with water and with anhydrous ethanol. The yield of fine white crystals was 2.62 g. (11.35 millimoles), 87.5%. The product had melting point 241–242° C. in an open capillary and melting point 241.5–242° C. in a sealed capillary.

Example 2
6-(N-METHYLFURFURYLAMINO)-PURINE

A mixture of 2 g. (12.95 millimoles) 6-chloropurine, 3 g. (27.0 millimoles) N-methylfurfurylamine and 10 ml. methyl Cellosolve was heated at reflux in an oil bath for 90 minutes. The cooled solution crystallized when transferred to a larger flask. The excess amine and solvent were distilled off under the reduced pressure of an oil vacuum pump. The crystalline residue was triturated with approximately 25 ml. of water and filtered. The filter cake was washed with water and then with methanol. The yield was 2.38 g. (10.38 millimoles), 80.25% of white crystals, melting point 210–211° C. (sealed capillary).

Example 3
6-BENZYLAMINOPURINE

A mixture of 2 g. (12.95 millimoles) 6-chloropurine, 5 ml. (46 millimoles) benzylamine, and 10 ml. methyl Cellosolve was refluxed 90 minutes with an oil bath. The cooled solution crystallized when the flask was scratched with a glass rod. The crystals were filtered off, washed with water and with anhydrous alcohol. The yield of pure white product was 2.70 g. (12.0 millimoles), 92.5%. The product had a melting point of 231° C.

Example 4

An assay medium was prepared as follows.

[1000 ml. of solution]

Made up to 1000 ml. with water:

| | |
|---|---|
| Sucrose | g 20 |
| Riker's salt solution (modified)[1] | ml 100 |
| Agar | g 10 |
| Thiamine | mg 0.1 |
| Indolacetic acid | mg 1 |
| Filtrate fraction from coconut milk (total solids) | g 7 |
| $Fe(SO_4) \cdot 6H_2O$ | mg 1 |

[1] Riker's solution [A.J. of Bot. 33, 591 (1946)].

A further solution was prepared by making the following formulation up to 9 liters as a stock solution. Ten percent of this stock solution was then added to the above medium:

[Modified]

| | G. |
|---|---|
| Sodium sulfate | 9.0 |
| Calcium nitrate·$4H_2O$ | 72.0 |
| Magnesium sulfate·$7H_2O$ | 65.0 |
| Potassium nitrate | 14.0 |
| Sodium dihydrogen phosphate | 12.0 |
| Manganese sulfate·$4H_2O$ | 0.40 |
| Zinc sulfate·$7H_2O$ | 0.27 |
| Boric acid | 0.27 |
| Potassium iodide | 0.033 |

On the above medium, plant tissue, such as carrot tissues isolated from the phloem region of one carrot, was cultured in darkness at a temperature of 25° C. with transfers every two weeks. The carrot tissue used was designated Clone II and being genetically homogeneous, it was used in all experiments for testing the growth of the present compound. The carrot tissue has been grown in the above manner for over a year, showing a constant rate of increase of about ten times the original dry weight during the original twenty-eight day period. In testing new compounds which are water-soluble, they are dissolved in water and added to the above assay medium. Other compounds which may be soluble only in alcohol are dissolved in methanol and added to the assay medium. The amounts added are so minute that the alcohol has no effect on the volume of assay medium used.

Example 5
6-(N-METHYLFURFURYLAMINO)-PURINE

A mixture of 20.0 g. (0.129 mole) 6-chloropurine, 30 g. (0.27 mole) N-methylfurfurylamine, and 100 ml. methyl Cellosolve was refluxed 90 minutes. The solvent and excess amine were distilled off under the reduced pressure for oil vacuum pump. The crystalline residue was triturated with 250 ml. water and filtered. The filter cake was washed with water and then with methanol. The yield was 23.8 g. (1.04 mole), 80.2% of almost white crystals, melting point 210–211° C. (sealed tube).

Example 6
6-(2-THENYLAMINO)-PURINE

A mixture of 20 g. (129.5 millimoles) of 6-chloropurine, 31.3 g. (276 millimoles) 2-thenylamine and 100 ml. methyl Cellosolve was refluxed with an oil bath 90 minutes. The cooled solution crystallized when shaken. The solvent and excess amine were distilled off under the reduced pressure of an oil vacuum pump. The residue was triturated with water and filtered. The filter cake was washed with water and with anhydrous ethanol. The yield of fine white crystals was 26.2 g. (113.5 millimoles), 87.5%. The product had melting point 241–242° C. in an open capillary and melting point 241.5–242° C. in a sealed capillary.

Example 7
6-BENZYLAMINOPURINE

A mixture of 20 g. (129.5 millimoles) 6-chloropurine, 50 ml. (460 millimoles) benzylamine, and 100 ml. methyl Cellosolve was refluxed 90 minutes with an oil bath. The cooled solution crystallized when the flask was scratched with a glass rod. The crystals were filtered off, washed with water and with anhydrous ethyl alcohol. The yield of white product was 27 g. (120 millimoles), 92.5%. The product had a melting point of 231° C.

Example 8
6-(o-METHYLBENZYLAMINO)-PURINE

In a 100 ml. flask fitted with a calcium chloride tube and reflux condenser were placed 3.0 grams of 6-chloropurine, 8.5 grams of o-methylbenzylamine and 30 ml. of methyl Cellosolve. The mixture was refluxed 1½ hours. At the end of this time, the reaction mixture was seeded and crystallization began. After standing overnight, the crystals were filtered and washed with methyl Cellosolve, water and ethyl alcohol in that order. The dried product weighed 4.10 grams, (88.5% yield), melting point 263° C.

Example 9
6-m-METHYLBENZYLAMINOPURINE

In a 100 ml. flask fitted with a calcium chloride drying tube and reflux condenser were placed 3.0 grams of 6-chloropurine, 8.5 grams of m-methylbenzylamine and 30 ml. of methyl Cellosolve. The mixture was refluxed 1½ hours. At the end of this time the Cellosolve was distilled off, the pH adjusted to 6 and water was added. A precipitate formed. The flask was reheated and cooled down, then placed in the chill room. The crystals were filtered off and washed with water, then with ether. The isolated material weighed 4.21 grams, a 91% overall yield, melting point 233.5–234.5° C.

Example 10
p-METHYLBENZYLAMINOPURINE

A mixture of 3 grams of 6-chloropurine, 30 ml. methyl Cellosolve and 8.5 grams of p-methylbenzylamine was refluxed 1½ hours. During this time protection from the atmosphere was achieved by the use of a calcium chloride tube. At the end of the refluxing period, a drop of the solution was removed and rubbed on a watch glass to obtain seeds, which were then added to the reaction mixture. On standing overnight, good crystals separated and they were filtered off and washed with methyl Cellosolve, water and ethyl alcohol in that order. The dried product weighed 4.10 grams, an 88.5% yield. The melting point was 263° C.

*Example 11*

6-(N-BENZYLMETHYLAMINO)-PURINE

In a 100 ml. flask fitted with a reflux condenser was added 3.0 grams of 6-chloropurine, 30 ml. of Cellosolve, and 8.5 grams of N-benzylmethylamine. After refluxing two hours, the reaction mixture was allowed to cool to room temperature and placed in the chill room. The crystals which had separated overnight were filtered off and washed with a little ethyl alcohol. The isolated material weighed 2.95 grams, 65.5% yield; melting point 114–114.7° C. An additional 1.33 grams was obtained by adding water to the original filtrate from above and chilling the solution.

*Example 12*

6-(α-PHENYLETHYLAMINO)-PURINE

A mixture of 3.0 grams of 6-chloropurine, 30 ml. Cellosolve, and 8.5 grams of α-phenylethylamine was refluxed for 1½ hours in a 100 ml. flask fitted with a reflux condenser. The reaction mixture was chilled and crystals which separated were filtered off and washed with a little water. The dried product weighed 3.24 grams, representing a 70% yield; melting point 198–202° C. A small portion of the above product was recrystallized from a mixture (v./v.) of 3 parts ethyl alcohol and 5 parts water. The melting point was 199–202° C.

*Example 13*

6-(2-PYRIDYLMETHYLAMINO)-PURINE

A mixture of 3 g. (0.0194 mole) 6-chloropurine, 10 ml. methyl Cellosolve and 6 g. (0.055 mole) 2-aminomethylpyridine was refluxed two hours. The product which crystallized from the solution on cooling was filtered off, washed with methyl Cellosolve, water and 95% ethanol. The yield was 2.41 g. (0.0106 mole), 55% of crystals, melting point 233–234° C. Recrystallization from methyl Cellosolve gave pure material, melting point 245–246° C.

*Example 14*

6-(3-PYRIDYLMETHYLAMINO)-PURINE

A mixture of 3 grams 6-chloropurine, 10 ml. methyl Cellosolve and 6 grams of 3-aminomethylpyridine was heated at reflux 3 hours in a 100 ml. flask on an oil bath. The solution crystallizes after seeding. The product was filtered off, washed with methyl Cellosolve, water and ethyl alcohol. The weight of this product was 2.75 grams; melting point 228–234° C. A second crop of crystals separated from the mother liquor on standing, making the total weight of material obtained 3.10 grams (70.5%). The combined crops were recrystallized from methyl Cellosolve, giving crystals, melting point 257° C.

*Example 15*

6-(3-PYRIDYLMETHYLAMINO)-PURINE DIHYDROCHLORIDE

Eighteen g. (0.0795 mole) of 6-(3-pyridylmethylamino)-purine was dissolved in 900 ml. of refluxing absolute ethanol and acidified by the addition of 130 ml. of 25% methanolic hydrogen chloride. On cooling the crystalline dihydrochloride separated. It was filtered off and washed with methanol and with ether. This gave 21.6 g. of product, melting point 276–279° C. Concentration of the mother liquors gave an addition 1.0 g. of crystals bringing the total yield of 22.6 g. (0.756 mole), 95%. One gram was recrystallized from 30 ml. of acetic acid. The recrystallized product had melting point 278–279° C.

*Example 16*

6-(4-PYRIDYLMETHYLAMINO)-PURINE

In a 100 ml. flask fitted with a reflux condenser, the following reagents were added and refluxed for three hours: 3.0 grams of 6-chloropurine, 20 ml. methyl Cellosolve and 6 grams of 4-aminomethylpyridine. At the end of this time the reaction mixture was chilled for 1½ hours and the crystals which separated were filtered off and washed with water, cold Cellosolve and cold ethyl alcohol. The dried product weighed 1.42 grams; melting point 247–248° C. This product was recrystallized from methyl Cellosolve (melting point 250–251° C.).

We claim:

1. A method of preparing compounds having the formula:

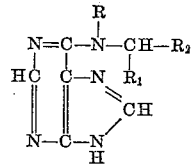

in which R and $R_1$ are members of the group consisting of hydrogen and lower alkyl and $R_2$ is a member of the group consisting of phenyl, lower alkylphenyl thenyl and pyridyl radicals which comprises heating 6-chloropurine and an amine having the formula:

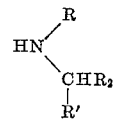

in which R, $R_1$ and $R_2$ are as defined above at a temperature within the range of about 60° C. to 150° C. and in an ethylene glycol monoloweralkyl ether and recovering said compound therefrom.

2. A method of preparing 6-(α-phenethylamino)-purine which comprises heating 6-chloropurine and α-phenylethylamine at a temperature within the range of about 60° C. to 150° C. and an ethylene glycol monoloweralkyl ether and recovering said compound therefrom.

3. A method of preparing 6-(2-thenylamino)-purine which comprises heating 6-chloropurine with 2-thenylamine at a temperature within the range of about 60° C. to 150° C. and an ethylene glycol monolower alkyl ether and recovering said compound therefrom.

4. A method of preparing 6-(3-pyridylmethylamino)-purine which comprises heating 6-chloropurine with 3-aminomethylpyridine at a temperature within the range of about 60° C. to 150° C. and an ethylene glycol monolower alkyl ether and recovering said compound therefrom.

5. A method of preparing 6-benzylaminopurine which comprises heating benzylamine with 6-chloropurine at a temperature within the range of about 60° C. to 150° C., and an ethylene glycol monolower alkyl ether and recovering said compound therefrom.

6. A method of preparing 6-(o-methylbenzylamino)-purine which comprises heating 6-chloropurine with o-methylbenzylamine at a temperature within the range of about 60° C. to 150° C. and an ethylene glycol monolower alkyl ether and recovering said compound therefrom.

7. The compound 6-(3-pyridylmethylamino)-purine.

8. A member of the group consisting of the compound 6-(3-pyridylmethylamino)purine and its acid addition salts.

9. The compound 6-(3-pyridylmethylamino)purine dihydrochloride.

10. 6-benzylaminopurine.

11. A compound selected from the group consisting of 6-(2-pyridyl methylamino)-purine, 6-(3-pyridyl methylamino)-purine, and 6-(4-pyridyl methylamino)-purine.

12. The compound 6-(2-pyridylmethylamino)-purine.

13. The compound 6-(4-pyridylmethylamino)-purine.

14. 6-thenylaminopurine.

(References on following page)

References Cited in the file of this patent

UNITED STATES PATENTS 2,705,715  Baker et al. _____ Apr. 5, 1955

OTHER REFERENCES

Fischer: "Ber.," 32, 435 (1899).
Elion et al.: J.A.C.S., 73, 5235–5239 (1951).
Elion et al.: J.A.C.S., vol. 74, p. 411 (1952).
Albert et al.: J. Chem. Soc. (London), p. 2069 (1954).
Bendich et al.: J. Am. Chem. Soc., vol. 76, page 6076 (1954).
Skinner et al.: J. Am. Chem. Soc., vol 77, pp. 6692–6693 (1955).
Waller et al.: S.N. 314,406, filed October 11, 1952 (now abandoned).